United States Patent
Chang et al.

(10) Patent No.: US 11,750,434 B2
(45) Date of Patent: Sep. 5, 2023

(54) MULTIDROP NETWORK SYSTEM AND NETWORK DEVICE

(71) Applicant: REALTEK SEMICONDUCTOR CORPORATION, Hsinchu (TW)

(72) Inventors: Yung-Le Chang, Hsinchu (TW); Li-Chung Chen, Hsinchu (TW); Yuan-Jih Chu, Hsinchu (TW); Shieh-Hsing Kuo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 47 days.

(21) Appl. No.: 17/697,466

(22) Filed: Mar. 17, 2022

(65) Prior Publication Data
US 2023/0010016 A1 Jan. 12, 2023

(30) Foreign Application Priority Data
Jul. 12, 2021 (TW) .................................. 110125538

(51) Int. Cl.
*H04L 27/01* (2006.01)
*H04L 27/26* (2006.01)
*G06F 18/214* (2023.01)

(52) U.S. Cl.
CPC ........ *H04L 27/2655* (2013.01); *G06F 18/214* (2023.01); *H04L 27/01* (2013.01)

(58) Field of Classification Search
CPC . G06F 18/214; H04L 25/03343; H04L 27/01; H04L 27/2655; H04L 5/0091; G06N 20/00
See application file for complete search history.

(56) References Cited

FOREIGN PATENT DOCUMENTS
EP        0180066 A2 *  5/1986

OTHER PUBLICATIONS

LAN/MAN Standards Committee "IEEE standard for Ethernet Amendment 5: Physical Layers Specifications and Manangement Parameters for 10 Mb/s Operation and Associated Power Delivery over a Single Balanced Pair of Conductor" 8023cg-2019 (clauses 147&clauses148), 2019, IEEE Standard Association.
(Continued)

*Primary Examiner* — Melvin C Marcelo
*Assistant Examiner* — Natali Pascual Peguero
(74) *Attorney, Agent, or Firm* — WPAT, P.C

(57) ABSTRACT

A multidrop network system includes N network devices including a master device and a plurality of slave devices. The N network devices synchronize their respective time zones in a synchronization phase, then jointly perform equalizer coefficient training in a training phase, and then obtain their respective transmission opportunities in turn in a data transmission phase. Each network device includes a channel equalizer trained in the training phase and used for processing data in the data transmission phase. In the training phase, the master device sends out a training notification to request the slave devices to enter the training phase; the master device performs the equalizer coefficient training after it transmits the training notification, and the slave devices perform the equalizer coefficient training after they receive the training notification. After the completion of the equalizer coefficient training, the master device sends out a beacon to start the data transmission phase.

20 Claims, 2 Drawing Sheets

(56) References Cited

OTHER PUBLICATIONS

IEEE Computer Society "Amendment 4: Physical Layer Specifications and Management Parameters for 1 GB/s Operation over a Single Twisted-Pair Copper Cable" IEEE802p3_bp_1000BaseT1 (clause 97), 2016, IEEE Standard Association.

IEEE Computer Society "Amendment 1: Physical Layer Specifications and Management Parameters for 100Mb/s Operation over a Single Balanced Twisted Pair Cable" IEEE802p3_bw_100BaseT1 (clause 96), 2015, IEEE Standard Association.

* cited by examiner

MULTIDROP NETWORK SYSTEM AND NETWORK DEVICE

BACKGROUND OF THE INVENTION

1. Field of the Invention

The present disclosure relates to a network system and a network device, especially to a multidrop network system and a network device of the multidrop network system.

2. Description of Related Art

Based on the IEEE 802.3cg standard, a physical layer collision avoidance (PLCA) multidrop network operates no faster than 10 Mbps. If one would like to improve this network speed, she/he has to consider channel effects and tackle the problems of Intersymbol Interference (ISI). The influences of the channel effects and ISI on a reception signal can be mitigated if a channel equalizer of a receiver is well trained. Although equalizer training is found in some standards (e.g., IEEE 802.3bw and IEEE 802.3 bp) for this technical field, these standards merely define ways to train channel equalizer coefficients under a peer-to-peer transmission configuration, and these ways are not workable to a multidrop network system.

SUMMARY OF THE INVENTION

An object of the present disclosure is to disclose a multidrop network system and a network device as improvements over the prior art.

An embodiment of the multidrop network system of the present disclosure includes N network devices, wherein the N is an integer equal to or greater than two. The N network devices include a master device and (N−1) slave device(s). Each of the N network devices has an identification code as identification in the multidrop network system and thus the N network devices having N identification codes in total. The N network devices synchronize their respective time zones in a synchronization phase. K network devices of the N network devices jointly perform equalizer coefficient training in a training phase, wherein the K is an integer equal to or greater than two, and the K is not greater than the N. The N network devices obtain their respective transmission opportunities in turn according to the N identification codes in a data transmission phase.

In regard to the above embodiment, the K network devices include the master device and (K−1) slave device(s), and each of the K network devices includes a channel equalizer that is trained in the training phase and used for processing data in the data transmission phase. In the synchronization phase, the master device transmits a beacon to the (N−1) slave device(s) to synchronize the time zone of the master device with the time zone(s) of the (N−1) slave device(s) before the start of each round of data transmission of the N network devices. In the training phase, the master device sends out a training notification to request the (K−1) slave device(s) to enter the training phase and then performs the equalizer coefficient training. The (K−1) slave device(s) perform(s) the equalizer coefficient training after the (K−1) slave device(s) receive(s) the training notification.

An embodiment of the network device of the present disclosure is a master device among N network devices of a multidrop network system, wherein the N is an integer equal to or greater than two. The N network devices include the master device and (N−1) slave device(s). The N network devices synchronize their respective time zones in a synchronization phase. K network devices of the N network devices jointly perform equalizer coefficient training in a training phase, wherein the K is an integer equal to or greater than two, but is not greater than the N. The N network devices obtain their respective transmission opportunities in turn in a data transmission phase.

In regard to the above embodiment, the K network devices include the master device and (K−1) slave device(s). In the synchronization phase, the master device transmits a beacon to the (N−1) slave device(s) to synchronize the time zone of the master device with the time zone(s) of the (N−1) slave device(s) before the start of each round of data transmission of the N network devices. In the training phase, the master device sends out a training notification to request the (K−1) slave device(s) to enter the training phase and then performs the equalizer coefficient training according to a training signal from each of the (K−1) slave device(s) and an original pattern of the training signal.

Another embodiment of the network device of the present disclosure is a first slave device among N network devices of a multidrop network system, wherein the N is an integer equal to or greater than two. The N network devices include a master device and (N−1) slave device(s). The N network devices synchronize their respective time zones in a synchronization phase. K network devices of the N network devices jointly perform equalizer coefficient training in a training phase, wherein the K is an integer equal to or greater than two, but is not greater than the N. The N network devices obtain their respective transmission opportunities in turn in a data transmission phase.

In regard to the above embodiment, the K network devices include the master device and (K−1) slave device(s), and the (K−1) slave device(s) include(s) the first slave device and (K−2) slave device(s). In the synchronization phase, the first slave device receives a beacon from the master device to synchronize the time zone of the first slave device with the time zone of the master device before the start of each round of data transmission of the N network devices. In the training phase, the first slave device receives a training notification from the master device to enter the training phase and then performs the equalizer coefficient training according to a training signal from each of the master device and the (K−2) slave device(s) and according to an original pattern of the training signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a multidrop network system and a network device of the multidrop network system. The multidrop network system and network device can perform channel equalizer coefficient training under a multidrop network configuration to improve the network speed. The background knowledge of a multidrop network system is found in the IEEE 802.3cg standard, and the background knowledge of channel equalizer coefficient training is found in the IEEE 802.3bw standard and IEEE 802.3 bp standard.

Figure 1:
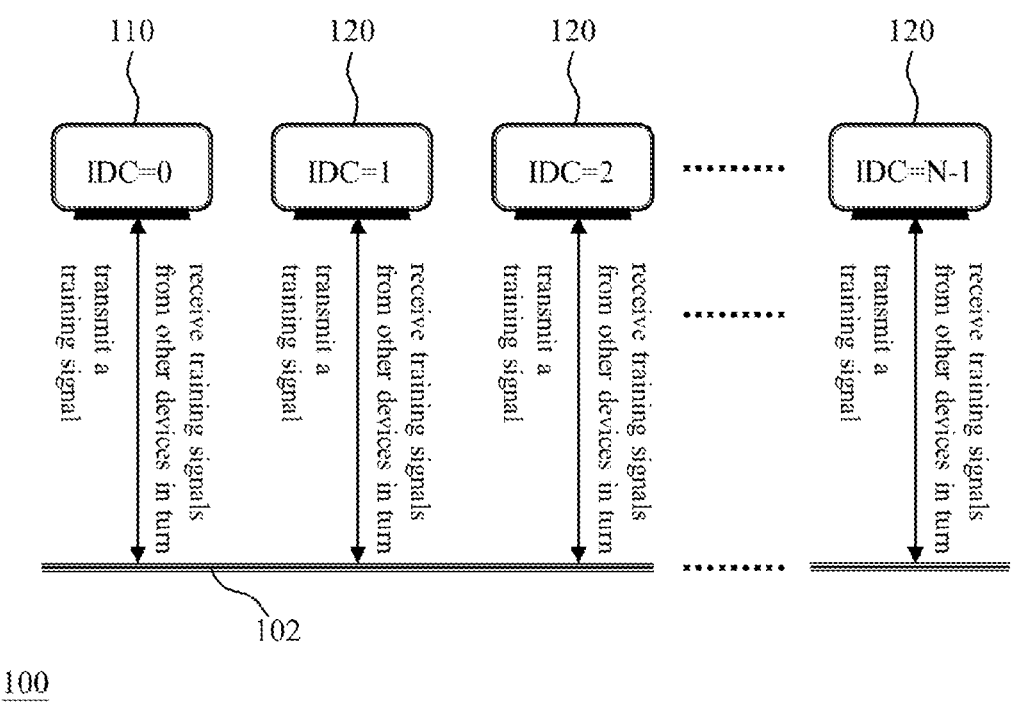
FIG. 1 shows an embodiment of the multidrop network system of the present disclosure.

FIG. 1 shows an embodiment of the multidrop network system of the present disclosure. The multidrop network system 100 of FIG. 1 includes N network devices, that is to say N nodes. The N is an integer equal to or greater than two. The N network devices exchange data through a physical transmission medium 102 (e.g., twisted pair cable or optical cable) and include a master device 110 and (N−1) slave device(s) 120. Each of the N network devices has an identification code (IDC) as identification in the multidrop network system 100 and thus the N network devices have N IDCs (e.g., 0, 1, 2, . . . , (N−2), and (N−1)) in total. The N network devices obtain their respective transmission opportunities in turn according to the N IDCs in each round of data transmission of the multidrop network system 100. Since ways to obtain transmission opportunities fall beyond the scope of the present disclosure and are not limitations on the present invention, the description of these ways is omitted here. Those having ordinary skill in the art can refer to the US patent application publication of publication number US 2019/0230705 A1 to learn how the N network devices obtain their respective transmission opportunities in turn according to the N IDCs.

Figure 2:
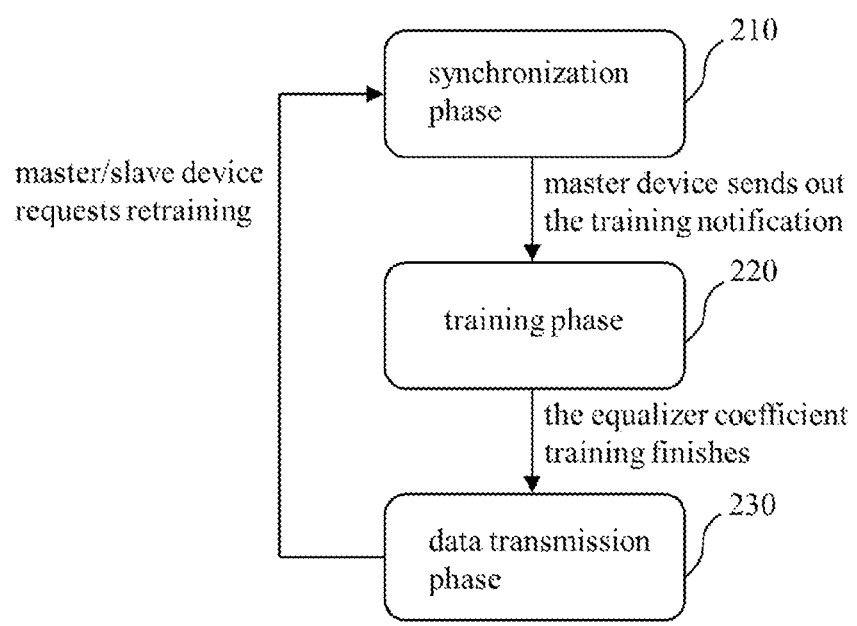
FIG. 2 shows the flow of operation phases of the multidrop network system of FIG. 1.

In regard to the embodiment of FIG. 1, the N network devices synchronize their respective time zones in a synchronization phase; K network devices of the N network devices jointly perform equalizer coefficient training in a training phase, wherein the K is an integer equal to or greater than two, and the K is not greater than the N; and the N network devices obtain their respective transmission opportunities in turn according to the N IDCs in a data transmission phase. FIG. 2 shows the flow of the synchronization phase 210, the training phase 220, and the data transmission phase 230. It is noted that if the K is not equal to the N, the N network devices include the K network devices (e.g., devices incorporating the present invention) and the other (N−K) network device(s) (e.g., devices without the present invention); the (N−K) network device(s) do(es) not perform the equalizer coefficient training in the training phase; and the (N−K) network device(s) may be incapable of recognizing a training notification as mentioned in the following paragraph and may not respond to the training notification. It is also noted that the K network devices include the master device 110 and (K−1) slave device(s) 120, and each of the K network devices includes a channel equalizer that is trained in the training phase and used for processing data in the data transmission phase.

In regard to the embodiment of FIG. 1, in the synchronization phase the master device 110 transmits a beacon to all the slave device(s) 120 to synchronize the time zone of the master device 110 with the time zone(s) of these slave device(s) 120 before each round of data transmission of the N network devices begins; and the above-mentioned synchronization can be realized with a known/self-developed means (e.g., every network device configured to reset its counter/timer according to the beacon). In the training phase, the master device 110 sends out the training notification to request the (K−1) slave device(s) 120 to enter the training phase. The master device 110 performs the equalizer coefficient training after it sends out the training notification; and the (K−1) slave device(s) 120 receive(s) the training notification and then perform(s) the equalizer coefficient training. After M round(s) of the equalizer coefficient training (hereinafter referred to as M round(s) of training), the master device 110 transmits the beacon to all the slave device(s) 120 to start the data transmission phase, wherein the M is a fixed/unfixed positive integer.

In an exemplary implementation, the M is a fixed positive integer, which means that the master device 110 transmits the beacon to all the slave device(s) 120 to start the data transmission phase after the M round(s) of training even though some of the K network devices may not finish the equalizer coefficient training yet.

In an exemplary implementation, the M is an unfixed positive integer. Each of the (K−1) slave device(s) 120 sends out a training-completion signal in at least one round of the M round(s) of training to announce its completion of the equalizer coefficient training. The last device to finish the equalizer coefficient training among the K network devices (i.e., the master device 110 and the (K−1) slave device(s) 120) finishes the equalizer coefficient training in the $M^{th}$ round (i.e., the last round) of the M round(s) of training; in other words, the value of the M is determined according to the time when all of the K network devices finish the equalizer coefficient training. After the master device 110 finishes the equalizer coefficient training and receives the training-completion signal from each of the (K−1) slave device(s) 120, the master device 110 transmits the beacon to all the slave device(s) 120 to start the data transmission phase.

In regard to FIGS. 1-2, after the master device 110 sends out the training notification, the K network devices perform the M round(s) of training. The K network devices send out K training signals in turn (e.g., the K network devices configured to send their respective training signals according to their respective IDCs) in an $X^{th}$ round of training among the M round(s) of training, wherein the X is a positive integer not greater than the M. Each of the K network devices receives (K−1) training signal(s) from the other (K−1) network device(s) in the $X^{th}$ round of training and performs the equalizer coefficient training according to the (K−1) training signal(s) and original pattern(s) of the (K−1) training signal(s). The equalizer coefficient training can be realized with a known/self-developed means such as those mentioned in the IEEE 802.3bw standard and/or the IEEE 802.3 bp standard. For example, the master device 110 receives the training signals from all the slave device(s) 120 in turn; upon receiving a training signal of a slave device 120, the master device 110 compares the training signal with the original pattern of the training signal to obtain a comparison result, then adjusts one or more channel equalizer coefficient(s) of the master device 110 according to the comparison result, and stores the coefficient(s) that are suitable for receiving the signal from the slave device 120. The way to perform the equalizer coefficient training for each slave device 120 can be the same as or derived from the above-mentioned example. In an exemplary implementation, the K training signals are the same before distortion, and the original patterns of the K training signals are the same and stored in the K network devices in advance for comparison; however, the present invention is not limited to the above features.

In regard to FIGS. 1-2, since the transmission environment could change over time, each of the K network devices in the data transmission phase can request the multidrop network system 100 to return to the training phase and perform the equalizer coefficient training again. In an exemplary implementation, the master device 110 sends out the training notification again in the data transmission phase to request the K network devices to return to the training phase. In an exemplary implementation, one of the (K−1) slave device(s) 120 sends out a retraining request in the data transmission phase to request the master device 110 to send out the training notification so as to request the K network devices to return to the training phase. In an exemplary implementation, the master device 110 receives the retraining request in a round of data transmission and sends out the training notification after this round of data transmission finishes. In an exemplary implementation, one of the (K−1) slave device(s) 120 sends out the retraining request in a round of data transmission while the other (K−2) slave device(s) remain(s) silent after it/they receive(s) the retraining request so that the master device 110 can immediately send out the training notification in response to the retraining request before the end of this round of data transmission.

Each network device (i.e., the master device 100 or any slave device 120) of the multidrop network system 100 in FIG. 1 can be implemented independently. Since those having ordinary skill in the art can appreciate the detail and modification of each network device of the multidrop network system 100 through the description of the embodiments of FIGS. 1-2, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the multidrop network system and network device of the present disclosure can perform channel equalizer coefficient training under a multidrop network configuration to improve the network speed.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A multidrop network system comprising N network devices, the N network devices including a master device and (N−1) slave device(s), each of the N network devices having an identification code as identification in the multidrop network system and thus the N network devices having N identification codes in total, the N network devices synchronizing their respective time zones in a synchronization phase, K network devices of the N network devices jointly performing equalizer coefficient training in a training phase, and the N network devices obtaining their respective transmission opportunities in turn according to the N identification codes in a data transmission phase, wherein:
   the N is an integer equal to or greater than two;
   the K is an integer equal to or greater than two, and the K is not greater than the N;
   the K network devices include the master device and (K−1) slave device(s), and each of the K network devices includes a channel equalizer that is trained in the training phase and used for processing data in the data transmission phase;
   in the synchronization phase, the master device transmits a beacon to the (N−1) slave device(s) to synchronize the time zone of the master device with the time zone(s) of the (N−1) slave device(s) before each round of data transmission of the N network devices begins; and
   in the training phase, the master device sends out a training notification to request the (K−1) slave device(s) to enter the training phase and then performs the equalizer coefficient training, and the (K−1) slave device(s) perform(s) the equalizer coefficient training after the (K−1) slave device(s) receive(s) the training notification.

2. The multidrop network system of claim 1, wherein the master device transmits the training notification in the data transmission phase to request the K network devices to return to the training phase.

3. The multidrop network system of claim 1, wherein one of the (K−1) slave device(s) sends out a retraining request in the data transmission phase to request the master device to send out the training notification, so as to request the K network devices to return to the training phase.

4. The multidrop network system of claim 3, wherein the master device receives the retraining request in a round of data transmission of the N network devices and sends out the training notification after the round of data transmission finishes.

5. The multidrop network system of claim 3, wherein the K is greater than two, (K−2) slave device(s) of the (K−1) slave devices receive(s) the retraining request in a round of data transmission of the N network devices and accordingly remain(s) silent; the master device receives the retraining request in the round of data transmission and sends out the training notification before the round of data transmission finishes; and the slave device sending out the retraining request is not included in the (K−2) slave device(s).

6. The multidrop network system of claim 1, wherein after the master device sends out the training notification, the K network devices perform M round(s) of training, each round of the M round(s) of training is a round of the equalizer coefficient training, and the M is a positive integer; each of the K network devices sends out a training signal in an $X^{th}$ round of training among the M round(s) of training, the K network devices send out K training signals in the $X^{th}$ round of training in total, and the X is a positive integer not greater than the M; and each of the K network devices receives (K−1) training signal(s) of the K training signals in the $X^{th}$ round of training and performs the equalizer coefficient training according to the (K−1) training signal(s) and original pattern(s) of the (K−1) training signal(s).

7. The multidrop network system of claim 6, wherein the K network devices have K identification codes in total; after the master device sends out the training notification, the K network devices send out the K training signals in turn according to the K identification codes in the $X^{th}$ round of training.

8. The multidrop network system of claim 1, wherein the K network devices perform M round(s) of training, each round of the M round(s) of training is a round of the equalizer coefficient training, and the M is a fixed positive integer; and after the M rounds(s) of training, the master device transmits the beacon to the (N−1) slave device(s) to start the data transmission phase.

9. The multidrop network system of claim 1, wherein the K network devices perform M round(s) of training, each round of the M round(s) of training is a round of the equalizer coefficient training, and the M is an unfixed positive integer; each of the (K−1) slave device(s) sends out a training-completion signal in at least one round of the M round(s) of training to announce a completion of the equalizer coefficient training, and a last device to finish the equalizer coefficient training among the master device and the (K−1) slave device(s) finishes the equalizer coefficient training in a last round of the M round(s) of training; and after the master device finishes the equalizer coefficient training and receives the training-completion signal from each of the (K−1) slave device(s), the master device transmits the beacon to the (N−1) slave device(s) to start the data transmission phase.

10. A network device being a master device among N network devices of a multidrop network system, the N network devices including the master device and (N−1) slave device(s), the N network devices synchronizing their respective time zones in a synchronization phase, K network devices of the N network devices jointly performing equalizer coefficient training in a training phase, and the N network devices obtaining their respective transmission opportunities in turn in a data transmission phase, wherein:

the N is an integer equal to or greater than two;

the K is an integer equal to or greater than two, and the K is not greater than the N;

the K network devices include the master device and (K−1) slave device(s);

in the synchronization phase, the master device transmits a beacon to the (N−1) slave device(s) to synchronize the time zone of the master device with the time zone(s) of the (N−1) slave device(s) before each round of data transmission of the N network devices begins; and in the training phase, the master device sends out a training notification to request the (K−1) slave device(s) to enter the training phase and then performs the equalizer coefficient training according to a training signal from each of the (K−1) slave device(s) and an original pattern of the training signal.

11. The network device of claim 10, wherein the master device receives a retraining request from one of the (K−1) slave device(s) in the data transmission phase and thereby sends out the training notification according to the retraining request.

12. The network device of claim 11, wherein the master device receives the retraining request in a round of data transmission of the N network devices and sends out the training notification after the round of data transmission finishes.

13. The network device of claim 11, wherein the master device receives the retraining request in a round of data transmission of the N network devices and sends out the training notification before the round of data transmission finishes.

14. The network device of claim 10, wherein after the master device sends out the training notification, the master device sends out a master device training signal to let each of the (K−1) slave device(s) perform the equalizer coefficient training according to the master device training signal and an original pattern of the master device training signal.

15. The network device of claim 10, wherein the K network devices perform M round(s) of training, each round of the M round(s) of training is a round of the equalizer coefficient training, and the M is a positive integer; after the M rounds(s) of training, the master device transmits the beacon to the (N−1) slave device(s) to start the data transmission phase.

16. The network device of claim 10, wherein after the master device finishes the equalizer coefficient training and receives a training-completion signal from each of the (K−1) slave device(s), the master device transmits the beacon to the (N−1) slave device(s) to start the data transmission phase.

17. A network device being a first slave device among N network devices of a multidrop network system, the N network devices including a master device and (N−1) slave device(s), the N network devices synchronizing their respective time zones in a synchronization phase, K network devices of the N network devices jointly performing equalizer coefficient training in a training phase, and the N network devices obtaining their respective transmission opportunities in turn in a data transmission phase, wherein:

the N is an integer equal to or greater than two;

the K is an integer equal to or greater than two, and the K is not greater than the N;

the K network devices include the master device and (K−1) slave device(s), and the (K−1) slave device(s) include(s) the first slave device and (K−2) slave device(s);

in the synchronization phase, the first slave device receives a beacon from the master device to synchronize the time zone of the first slave device with the time zone of the master device before each round of data transmission of the N network devices begins; and in the training phase, the first slave device receives a training notification from the master device to enter the training phase and then performs the equalizer coefficient training according to a training signal from each of the master device and the (K−2) slave device(s) and according to an original pattern of the training signal.

18. The network device of claim 17, wherein the first slave device sends out a retraining request in the data transmission phase to request the master device to send out the training notification again.

19. The network device of claim 17, wherein the first slave device sends out a first training signal in the training phase to let the master device and the (K−2) slave device(s) perform the equalizer coefficient training according to the first training signal and an original pattern of the first training signal.

20. The network device of claim 17, wherein after the first slave device finishes the equalizer coefficient training, the first slave device sends out a training-completion signal, and afterward the first slave device enters the data transmission phase according to the beacon from the master device.

* * * * *